United States Patent [19]
Hyyrynen et al.

[11] Patent Number: 5,852,650
[45] Date of Patent: Dec. 22, 1998

[54] METHOD FOR RECOVERING A FAULTY UNIT AND A RECOVERY SYSTEM

[75] Inventors: Altti Hyyrynen, Vantaa; Jussi Sarpola, Oulu; Pekka Hirvonen, Vantaa, all of Finland

[73] Assignee: Nokia Telecommunications Oy, Espoo, Finland

[21] Appl. No.: 793,401

[22] PCT Filed: Aug. 22, 1995

[86] PCT No.: PCT/FI95/00444

§ 371 Date: Feb. 21, 1997

§ 102(e) Date: Feb. 21, 1997

[87] PCT Pub. No.: WO96/06474

PCT Pub. Date: Feb. 29, 1996

[30] Foreign Application Priority Data

Aug. 23, 1994 [FI] Finland ................................. 943874

[51] Int. Cl.⁶ ........................... H04M 1/24; G06F 11/00
[52] U.S. Cl. ................... 379/29; 379/22; 379/1; 379/2; 395/182.13
[58] Field of Search ............. 379/1, 2, 10, 15, 379/22, 24, 26, 27, 29, 30, 32, 33, 34; 370/242, 294; 395/181, 182.13, 182.14, 182.19

[56] References Cited

U.S. PATENT DOCUMENTS

| | | | |
|---|---|---|---|
| 5,113,426 | 5/1992 | Kinoshita et al. | 379/33 |
| 5,260,945 | 11/1993 | Rodeheffer . | |
| 5,390,231 | 2/1995 | Hung et al. | 379/26 |

OTHER PUBLICATIONS

Electrical Communication, vol. 59, No. 1/2, 1985, (Harlow, Essex), M. Beyltjens et al.,"System 12—Switching System Maintenance", pp. 80–88.

*Primary Examiner*—Paul Loomis
*Attorney, Agent, or Firm*—Pillsbury Madison & Sutro LLP

[57] ABSTRACT

In a method and system for recovering a faulty unit, a predetermined number of recovery periods, and the maximum number of times a recovery act is carried out during a recovery period, are defined. A faulty unit is taken out of operation, recovered (i.e. subjected to a procedure designed for remediating the fault, if possible), and brought back into operation if tests indicate that the unit is in condition (i.e., is not faulty). The recovered unit is monitored for the time of succeeding recovery periods and is re-recovered, if necessary, provided that the number of the recovery acts carried out during each recovery period does not exceed the maximum number predetermined for the respective period. As a result, bouncing of the unit back and forth in an uncontrolled manner, if the fault is of such a type that the recovery system cannot detect it on the basis of the tests carried out, is reduced and eventually curtailed.

6 Claims, 2 Drawing Sheets

— 5,852,650 —

METHOD FOR RECOVERING A FAULTY UNIT AND A RECOVERY SYSTEM

This application is the national phase of international application PCT/FI95/00444, filed Aug. 22, 1995 which designated the U.S.

FIELD OF INVENTION

This invention relates to a method for recovering a faulty unit, comprising the steps of defining a predetermined number of recovery periods and the maximum number of times a recovery act will be carried out during a recovery period; taking a faulty unit out of operation, recovering the unit, subjecting the unit to tests for determining whether the unit remains faulty, or is in condition (meaning that the unit, when tested, seems not to be faulty), bringing the unit back into operation if tests that have been carried out indicate that it is in condition, and setting the recovered unit under monitoring for the time of a recovery period, as a monitored unit whereby the monitored unit is again re-recovered, if necessary, provided that the number of the recovery acts carried out during the recovery period does not exceed the maximum number predetermined for the period. The invention further relates to a recovery system for recovering a faulty unit, comprising: recovery means for testing the operation of the faulty unit and recovering the unit if the tests that have been carried out indicate that it is in condition, a recovery act counter for counting the number of recovery acts that have been carried out for the unit, whereby the recovery means are arranged to monitor the operation of the unit and re-recover the faulty unit if necessary, and to change the value of the recovery act counter, if the recovery act counter has not reached a predetermined threshold value.

The term recovery refers herein to testing the operation of the faulty unit whereafter the unit is brought back into operation if it is in condition according to the tests that have been carried out (i.e. is found as a result of testing not to be faulty at the time of testing). If the tests show that the unit cannot be recovered, it will be left in an inoperative state until maintenance personnel take over the situation.

BACKGROUND ART

This invention is closely connected with an automatic maintenance system, e.g. in a telephone exchange where a maintenance system continuously monitors the operation of units included in the system. If the maintenance system detects that one of the units is faulty, the maintenance system will immediately send an alarm to a recovery system. The recovery system will then take the faulty unit out of operation, by replacing it e.g. with another unit of a similar type if the faulty unit is doubled (i.e. a spare for it is already in place and awaiting being placed in operation instead of the faulty unit). In case the faulty unit is not doubled, the operation of the system (e.g. the telephone exchange) will be interrupted in this respect until the faulty unit is repaired or replaced with another unit.

Once the recovery system has taken the faulty unit out of operation, it tests the functions of the faulty unit by means of predetermined test procedures. If the tests show that the faulty unit is in condition, the recovery system will automatically bring the unit back into operation (at least in the case where the unit is not doubled). In another case, i.e. if the tests indicate that the unit is faulty, the unit will be taken out of operation permanently, until the maintenance staff take over the situation.

The weakness of the prior art recovery system described above is that it loads the system unnecessarily in cases where the fault occurring in the unit is of such a type that the recovery system cannot detect the fault on the basis of the tests carried out by it. In this case, the recovery system repeatedly indicates that the unit is in condition, and brings the unit back into operation after the tests. The maintenance system, in turn, re-detects a fault immediately once the recovered unit has been taken back into operation and sends a new alarm to the recovery system. The unit thus "bounces" back and forth in an uncontrolled manner, which causes an unnecessary load both to the maintenance system and the recovery system.

SUMMARY OF THE INVENTION

The object of this invention is to solve the problem mentioned above and provide a method for recovering a unit and a recovery system which will make it possible to reduce bouncing described above and thus avoid unnecessary loading of the maintenance system. These objects are achieved with the method of the invention which is characterized in that in said method the length of each recovery period is determined, whereby on termination of a recovery period, the unit is set under monitoring for the duration of a new recovery period provided that the unit has been recovered at least once during the terminated recovery period and that the terminated recovery period was not the last defined recovery period, and after the termination of the last defined recovery period the unit is no longer recovered.

The invention further relates to a recovery system in which the method of the invention may be applied. The system of the invention is characterized by further comprising: a timer means for measuring a recovery period; a recovery period counter for counting the recovery periods, whereby the recovery means are arranged to initialize the timer means, the recovery period counter and the recovery act counter to predetermined initial values after the first recovery act, and upon the timer means reaching a predetermined threshold value, the recovery means are adapted to:

change the value of the recovery period counter and initialize the timer means and the recovery act counter to initial values corresponding to the new value of the recovery period counter if the value of the recovery act counter deviates from its initial value and the recovery period counter has not reached a predetermined threshold value, take the unit out of monitoring if the value of the recovery act counter corresponds to its initial value, and prevent the recovery of the unit in future if the value of the recovery act counter deviates from the initial value of the terminated recovery period and the recovery period counter reaches the predetermined threshold value.

The invention is based on the idea that when the recovered unit is set under monitoring, whereby the number of the recovery acts carried out during a recovery period of a predetermined length is limited to a predetermined value, the bouncing of the faulty unit and thus the unnecessary loading of the maintenance system and the recovery system will be reduced.

The most remarkable advantages of the recovery system of the invention are thus effective reduction of bouncing of the faulty unit (i.e. shifting from an active state into a passive state) and savings in the resources of the maintenance system, and the possibility that the maintenance personnel can take over the situation manually at any time by replacing the faulty unit with another one, for example, whereafter the recovery system automatically recovers the new unit after a while and detects that it is operative (without detecting that it is actually a question of another unit).

In a preferred embodiment of the invention, the number of successive recovery periods is limited to a predetermined value and the length of the recovery periods and the number of the recovery acts are simultaneously increased at the beginning of each recovery period, which results in accomplishing a recovery system having a highly efficient filtering condition. In other words, the time between the recovery acts is increased each time when shifting from one recovery period to another with the result that the more time has passed from the first recovery act of the unit, the less load is caused on the system by the recovery measures. Thus, the system is allowed sufficient time to recover after a very long interference period, (i.e. the total duration of the recovery periods is relatively long). The operator of the system may also alter the filtering condition of the system quite easily, only by altering the set threshold values.

BRIEF DESCRIPTION OF THE DRAWINGS

In the following, the invention will be described in greater detail with reference to the accompanying figures, in which.

DESCRIPTION OF A PREFERRED EMBODIMENT

Figure 1:
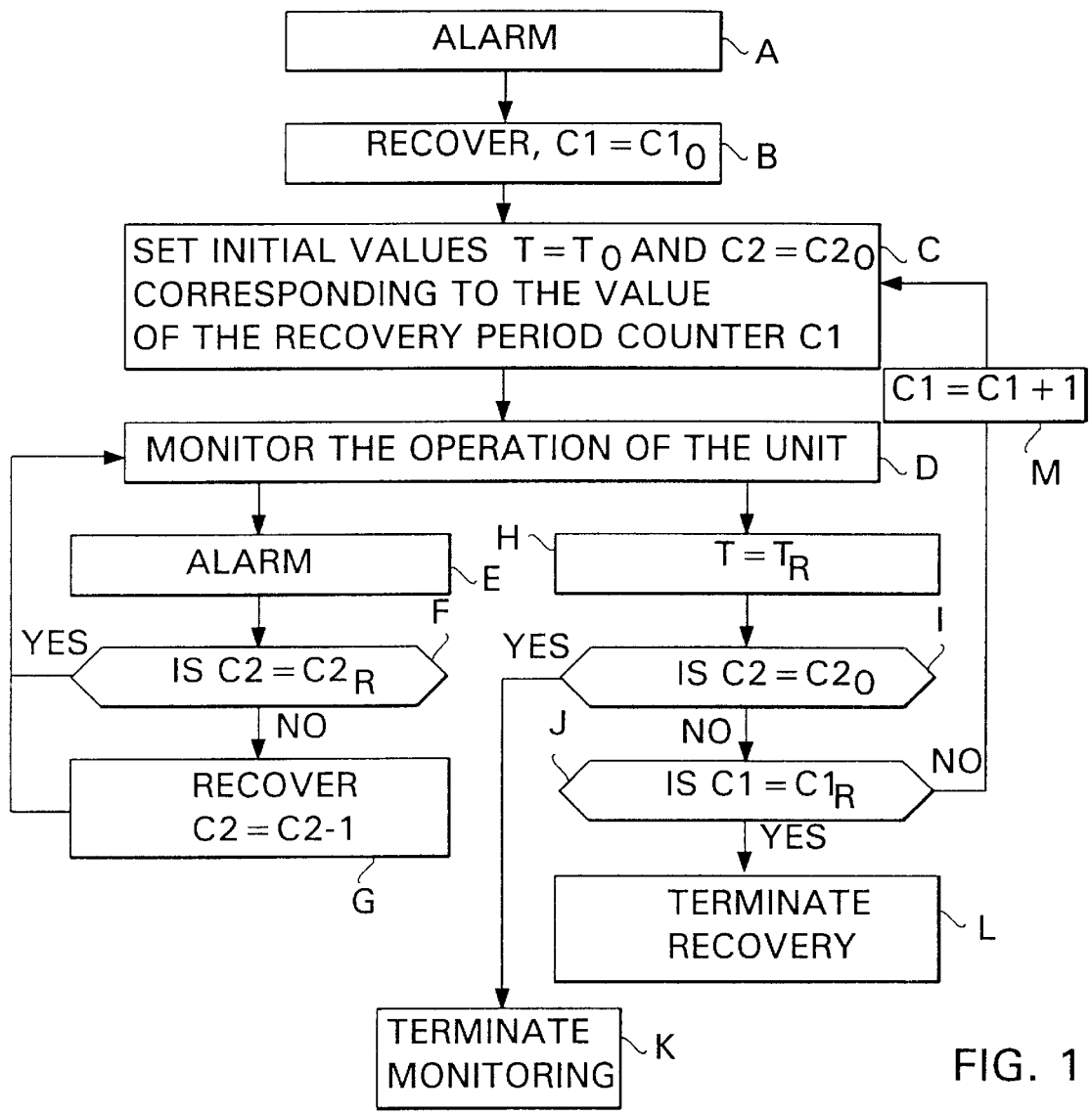
FIG. 1 shows a flow diagram of a first preferred embodiment of the method of the invention.

FIG. 1 shows a flow diagram of the first preferred embodiment of the method of the invention. In block A, an alarm of a certain unit is received. In block B, predetermined tests are carried out for a faulty unit for locating the fault. If the tests that have been carried out show that the unit is in condition (is at the time of testing, determined not to be faulty), it will be recovered (i.e. provisionally restored to service). The recovered unit is set under monitoring. For carrying out this procedure, a recovery period counter C1 is set to a predetermined initial value $C1_0$ (preferably=1).

In block C of FIG. 1, a recovery act counter C2 and a timer T are initialized to initial values $C2=C2_0$ and $T=T_0$ corresponding to the value of the recovery period counter C1. These initial values may be e.g., the following:

| Value of C1 | $T_0$ | $C2_0$ |
|---|---|---|
| 1 | 15 (min) | 1 |
| 2 | 30 | 2 |
| 3 | 60 | 4 |
| 4 | 120 | 7 |

In block D, the operation of the recovered unit is monitored. If the unit fails again, i.e. a new alarm is received of it, the procedure shifts from block D via block E to block F. In block F it is checked whether the recovery act counter C2 has reached the threshold value $C2_R$ (preferably 0) given to it, i.e. whether all recovery acts defined to the recovery period in question are already completely used. If this is the case, the procedure returns to block D. If there are still recovery acts available, the procedure shifts to block G where the unit is re-recovered (if possible, according to the tests), whereafter the value of the recovery act counter C2 is decreased by one. From block G the procedure returns to block D where the operation of the unit is further monitored.

When the timer T reaches the threshold value $T_R$ (preferably 0 min) set to it, i.e. the ongoing recovery period terminates, the procedure shifts via block H to block I. In block I it is checked whether the value of counter C2 corresponds to the initial value $C2_0$ given to it. If this is the case, it indicates that the unit has not been recovered at all during the recovery period, i.e. it has been operating faultlessly. In that case, the procedure shifts to block K where the monitoring of the unit is terminated.

If the value of counter C2, however, does not correspond to its initial value $C2_0$ in block I, the procedure shifts to block J where it is checked whether the recovery period counter C1 has reached the predetermined threshold value $C1_R$ (preferably 4). If this is the case, it indicates that the terminated recovery period was the last recovery period, and the procedure shifts to block L where the recovery of the unit is terminated "permanently", i.e. until the maintenance personnel take over the situation.

If it is detected in block J, however, that the recovery period counter C1 has not reached the threshold value $C1_R$, the procedure shifts to block M where the value of the recovery period counter C1 is increased by one. After this, the procedure returns to block C, where the recovery act counter C2 and the timer are initialized to values corresponding to the new value of the recovery period counter Cl, whereafter a new recovery period follows as described above.

Figure 2:
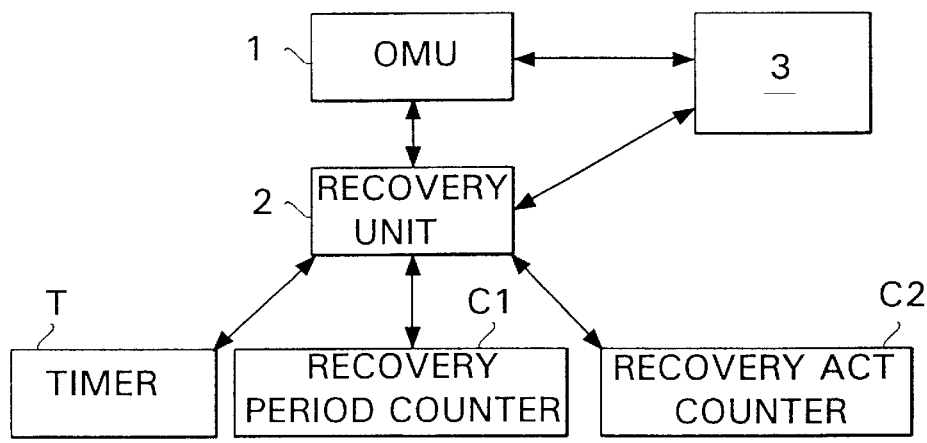
FIG. 2 shows a block diagram of a first preferred embodiment of the recovery system of the invention.

FIG. 2 shows a block diagram of the first preferred embodiment of the recovery system of the invention. The recovery system shown in FIG. 2 functions in the way shown by the flow diagram in FIG. 1. FIG. 2 shows unit 3 that may be, e.g., a part of a telephone exchange.

The operation of unit 3 is controlled and monitored by an operation and maintenance unit (OMU) 1. When the operation and maintenance unit 1 detects a malfunction in unit 3, it immediately alerts the recovery system to the matter. A recovery unit 2 included in the recovery system then immediately takes the faulty unit out of operation after having received an alarm of the unit. Once the faulty unit is taken out of operation, the recovery unit 2 directs unit 3 into a testing state and activates a diagnostics for the unit for testing unit 3 in order to locate the fault. If the tests show that unit 3 is faulty, the recovery unit 2 takes the unit 3 permanently out of operation until the maintenance personnel take over the situation. In another case, i.e. if the faulty unit is proved to be in condition on the basis of the tests, the recovery unit 2 automatically returns unit 3 into operation simultaneously when the recovery unit 2 initializes the timer T, the recovery period counter C1 and the recovery act counter C2 to predetermined initial values $T_0$, $C1_0$ and $C2_0$. These initial values may be for instance: $T_0=15$ (min), $C1_0=1$ and $C2_0=1$.

In the case shown in FIG. 2, the recovery unit 2 is arranged to increase the value of the recovery period counter C1 by one at the beginning of each new recovery period. The timer T is arranged to measure proceeding of a recovery period by decreasing its value, and the recovery unit is arranged to maintain the recovery act counter C2 so that the value of the counter is decreased by one each time when unit 3 is recovered.

Once unit 3 has been recovered for the first time, the recovery unit 2 starts monitoring the operation of unit 3. If the operation and maintenance system 1 repeatedly signals an alarm of unit 3 to the recovery system (which is possible if the fault is of such a type that cannot be detected by the recovery unit 2 by means of the tests), the recovery unit 2 will not automatically recover unit 3, but the recovery unit 2 first checks whether the number of recovery acts predetermined for the recovery period in question has already been completed, i.e. whether the recovery act counter C2 has already reached the predetermined threshold value $C2_R$ (preferably=0). Only after this check, the recovery unit 2 activates the diagnostics for unit 3, and recovers the unit 3 if possible. After the recovery act, the recovery unit 2 changes the value of the recovery act counter C2 by decreasing the value of the recovery act counter C2 by one.

When the timer T reaches the predetermined threshold value $T_R$ (preferably=0 min), the recovery unit 2 checks the values of the recovery period counter C1 and the recovery act counter C2, and:

- if $C2 \neq C2_0$ and $C1 \neq C1_R$, the recovery unit 2 increases the value of the recovery period counter by one, and initializes the recovery act counter C2 and the timer means T to the initial values $C2_0$ and $T_0$ corresponding to the new value of the recovery period counter,
- if $C2=C2_0$, the recovery unit takes the unit 3 out of monitoring (the unit is operating normally), and
- if $C1=C1_R$ and $C2 \neq C2_0$, the recovery unit interrupts the recovery procedure of unit 3 "permanently", i.e. until the maintenance staff take over the situation.

By employing several recovery periods which are different in duration, and by limiting the number of the recovery acts during a period, a recovery system is achieved that is capable of managing a bouncing unit so that a minimum load is caused to the operation and maintenance unit.

If the recovery system is used for monitoring several units, a separate recovery period counter and a recovery act counter are used for each unit. In this case, the timer shown in FIG. 2 is preferably replaced with a unit-specific counter, and a timer common to all monitored units. The common timer then constantly measures periods of a certain duration, e.g. of 15 min, whereafter the unit-specific counter/counters are updated each time when the timer indicates that a period of a certain duration has terminated. In other words, if a recovery period of, e.g., 45 minutes is to be measured for a certain unit, the unit-specific counter of the unit is given the value 3, subsequent to which the value of the unit-specific counter is decreased by one each time when the timer indicates that a period of 15 minutes has passed, until the unit-specific counter reaches the value 0, which indicates that the recovery period has terminated.

Figure 3:
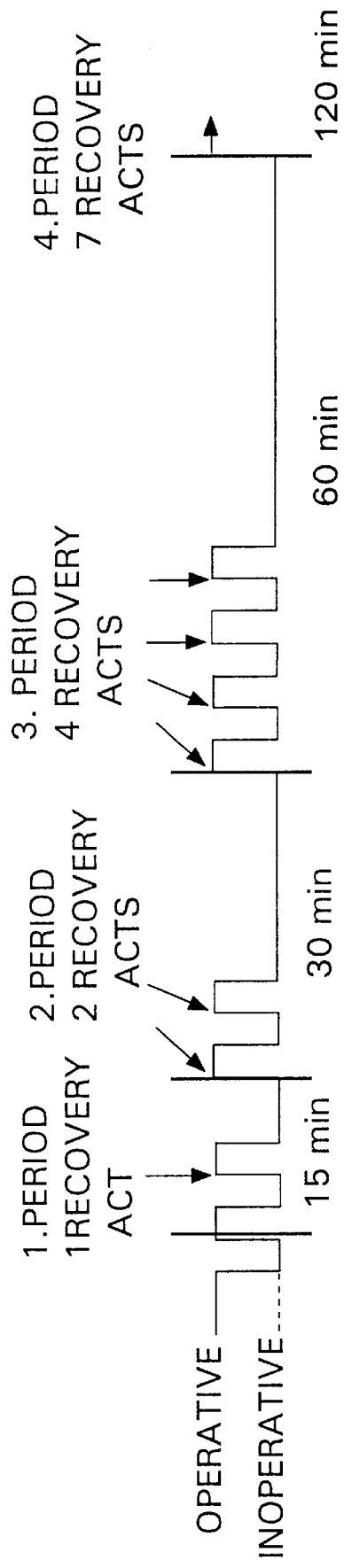
FIG. 3 illustrates the behavior of a bouncing unit when the recovery system of FIG. 2 is utilized.

FIG. 3 illustrates the behavior of a bouncing unit 3 when the recovery system shown in FIG. 2 is employed. FIG. 3 shows the behavior of unit 3 during the first three recovery periods. At the point of descending edges of the curve shown in FIG. 3 the recovery system takes the unit out of operation owing to a fault detected in it, and accordingly, at ascending edges, the unit is recovered and brought back into operation. The recovery acts to be performed during recovery periods 1–3 are marked with arrows in FIG. 3.

In the situation shown in FIG. 3, the unit has such a fault that cannot be detected by the tests carried out by the recovery system, owing to which the recovery system repeatedly makes an attempt to recover the unit. Since the fault has not been eliminated from the unit after the recovery procedure either, the operation and maintenance unit repeatedly gives the recovery system a new alarm of the unit in question, which causes "bouncing" of the unit between the operative and the inoperative state.

It appears from FIG. 3 that, subsequent to the first recovery act, the recovery unit 2 (shown in FIG. 2) starts the timer T for measuring the first recovery act. Subsequent to the first recovery act, however, the unit immediately "fails" again, owing to which it is taken out of operation almost immediately. Since the recovery system cannot detect the fault, it will recover the unit again immediately after the beginning of the first recovery period. It appears from FIG. 3, however, that the unit is still not in condition, but it fails again. During the first recovery period, however, the number of the recovery acts is limited to one, whereafter the unit will remain in an inoperative state until the termination of the recovery period. The length of the first recovery period is 15 min. The unit thus remains out of operation until the beginning of the second recovery period, during which the unit is recovered twice, but it still does not operate, and repeatedly fails again. The unit remains again in an inoperative state until the termination of the second recovery period, whereby it is re-recovered four times during the third recovery period. Since the unit still does not operate, the fourth recovery period (not shown in the Figure), 120 min. in duration follows after the third recovery period. The unit is recovered 7 times during the fourth recovery period.

Upon expiration of the fourth recovery period, the unit will be left in an inoperative state, and recovery attempts are interrupted until the maintenance personnel take over the situation. However, if the unit remains in operation after the recovery carried out during the third recovery period, and there is no need to recover it during the fourth recovery period, the unit is detected to be in an operative state and the monitoring is terminated. If the unit which has once been taken out of the monitoring state fails again later, the recovery of the unit will be started from the beginning, i.e. from the first recovery period.

It should be understood that the above description and the figures associated therewith are only intended to illustrate the present invention. The lengths and the number of the recovery periods, and the number of the recovery acts carried out during them may vary. Different modifications and variations will be obvious for a person skilled in the art without deviating from the scope and the spirit of the invention set forth in the attached claims.

We claim:

1. A method for recovering a faulty unit, comprising:
   (a) defining a predetermined number of recovery periods;
   (b) defining for each of said recovery periods a respective maximum number of times for conducting a recovery act during the respective recovery period, and a duration period for the respective recovery period;
   (c) upon detecting that a unit appears to be faulty, removing the unit from service;
   (d) subjecting the unit removed from service to a recovery act;
   (e) testing the unit which has been subjected to a recovery act, and, only if as a result of such testing the unit is found to be apparently in condition for being placed in service, provisionally placing the unit in service, for enabling monitoring of the unit;
   (f) monitoring the unit which has been provisionally placed in service, by initiating a first or whichever next one of said recovery periods as has not so far in this conducting of step (f) been initiated in regard to the unit, and, in that recovery period awaiting a detection that the unit appears to be faulty;
   (g) upon detecting that the unit being monitored appears to be faulty,
      (i) removing the unit from service,
      (ii) determining whether any said recovery act remains available to be done in the respective said recovery period which is now underway, and, only if so, performing a respective next remaining available said recovery act in relation to said unit, (iii) testing the unit which has subjected to said recovery act of step (g)(ii), and only if as a result of such testing the unit is found to be apparently in condition for being placed in service, again provisionally placing the unit in service, for enabling continuation of monitoring of said unit; and (h) repeating conducting of steps (f) and (g) in relation to said unit, provided that during the respective immediately previous conducting of steps (f) and (g), at least one said act of recovery has been conducted in relation to said unit, until said unit has been monitored for said predetermined number of recovery periods; and then (i) conducting step (g)(i), but terminating further conducting of steps (g)(ii) and (g)(iii) in relation to said unit.

2. The method of claim 1, wherein:

in conducting step (b), a first said recovery period is defined to be the shortest in duration, and each succeeding said recovery period is defined to be larger in duration than the respective immediately preceding said recovery period.

3. The method of claim 2 wherein:

in conducting step (b), the maximum number of times for conducting a recovery act for said first recovery period is defined to be a number which is the lowest for all of said recovery periods, and the maximum number of times for conducting a recovery act for each succeeding said recovery period is defined to be no smaller, and possibly larger than the maximum number of times for conducting a recovery act in the respective immediately preceding said recovery period.

4. The method of claim 1, comprising:

conducting said detecting that said unit appears to be faulty, by an operation and maintenance unit, in regard to a part of a telephone exchange as said unit; and conducting said removing of said unit from service by a recovery unit of a recovery system.

5. A recovery system for recovering a faulty unit, comprising:

recovery means for testing operation of a unit removed from service upon being indicated to be faulty, and for determining from results of the testing whether the unit appears to be faulty, in a recovery act, so that the unit can be at least provisionally restored to service if in condition by being apparently not faulty, and can be kept out of service for maintenance attention if not in condition by being apparently faulty;

a timer arranged for to count, upon being initialized for the starting of each respective one of a plurality of recovery periods, in a series having a predetermined number of recovery periods, passage of time of a predetermined time of duration for each of said recovery periods for controlling expiration of each of said recovery periods;

a recovery period counter arranged for counting said recovery periods for controlling whether any of said recovery periods remain to be practiced;

a recovery act counter arranged for counting during each respective one of said recovery periods which occurs, and in which at least one said recovery act occurs, the number of said recovery acts which occur, to a predetermined allowable maximum which are permitted to occur in the respective recovery period;

said recovery means being arranged to perform an initial instance of said recovery act in relation to the unit indicated to be faulty and if, as a consequence of the respective said testing, the unit appears to be in condition, for provisionally restoring the unit to service and conducting of a monitoring procedure which includes initializing said timer means for the start of a first one of said recovery periods in said series, said recovery period for counting said recovery periods in said series and said recovery act counter for counting the number of said recovery acts which occur in each respective recovery period;

said recovery means being further arranged to respond to expiration of each recovery period as counted by said timer, to:

initialize the timer for a respective next said recovery period in said series, correspondingly increment said recovery period counter, and correspondingly set an initial value for said recovery act counter if said recovery act counter has counted occurrence of at least one recovery act in the respective just-expired said recovery period, and said recovery period counter has not already counted to said predetermined number of recovery periods;

terminate monitoring if the recovery act counter has counted no occurrence of any recovery act in the respective just-expired said recovery period; and keep said unit out of service if, at the expiration of the last of said recovery periods in said series, said recovery act counter has counted occurrence of at least one recovery act in the last recovery period.

6. The recovery system of claim 5, wherein:

said recovery means serves an operation and maintenance unit for a telephone exchange, of which said unit is a part.

* * * * *